United States Patent [19]
Jensen

[11] 3,973,717
[45] Aug. 10, 1976

[54] BUSHING FABRICATION
[75] Inventor: Thomas H. Jensen, Murrysville, Pa.
[73] Assignee: PPG Industries, Inc., Pittsburgh, Pa.
[22] Filed: Apr. 21, 1975
[21] Appl. No.: 570,151

[52] U.S. Cl............................ 228/144; 228/173; 29/163.5 R
[51] Int. Cl.² ........................................ B21C 37/15
[58] Field of Search............ 425/DIG. 217; 65/12; 29/163.5 R; 228/144, 151, 174, 173

[56] References Cited
UNITED STATES PATENTS

| | | | |
|---|---|---|---|
| 1,053,614 | 2/1913 | Layne | 29/163.5 R X |
| 1,256,905 | 2/1918 | Kass | 29/163.5 R X |
| 1,774,386 | 8/1930 | Lard | 228/151 |
| 2,495,956 | 1/1950 | Cook | 65/12 X |
| 3,514,841 | 6/1970 | Woodward et al. | 228/155 |
| 3,625,025 | 12/1971 | Jensen | 65/12 X |

Primary Examiner—James L. Jones, Jr.
Assistant Examiner—K. J. Ramsey
Attorney, Agent, or Firm—John E. Curley

[57] ABSTRACT

A method of producing a fiberizing unit for use in producing glass fibers is shown which involves forming a sheet of metal in the form of a cylinder and providing projections on the underside on a section of said cylinder. Holes are provided through the projections to the center of the cylinder for fluid communication from the center of the cylinder to the exterior thereof through the projections.

6 Claims, 9 Drawing Figures

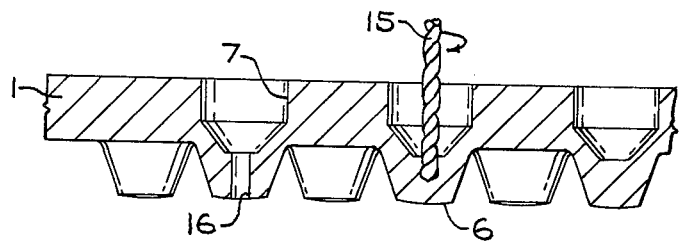
FIG.5
FIG.6
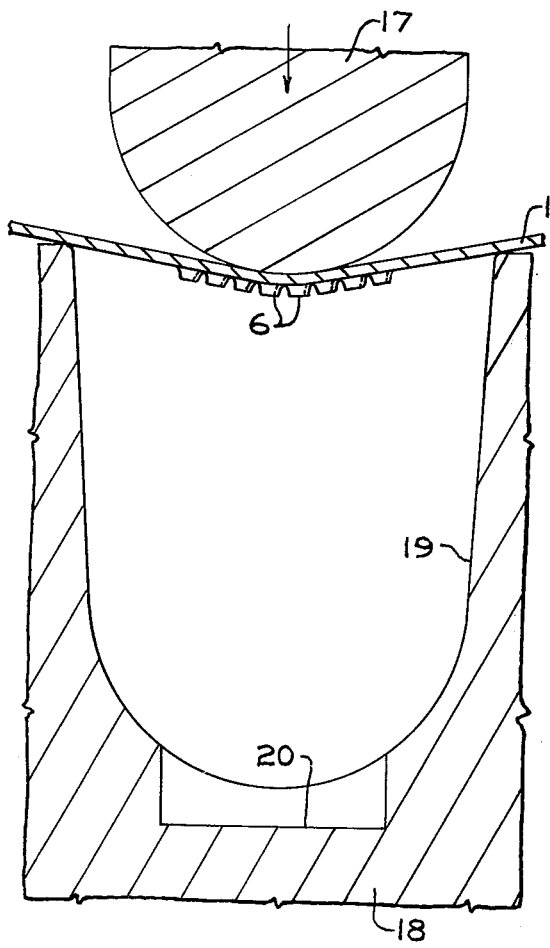
FIG.7
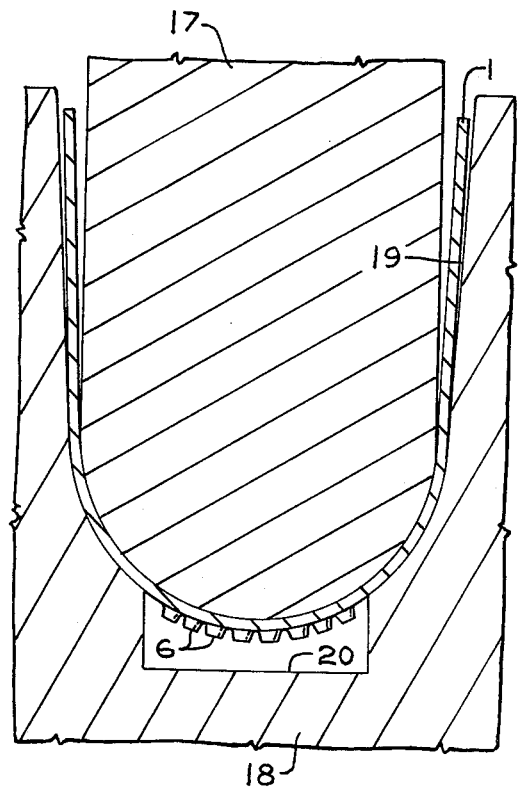

BUSHING FABRICATION

BACKGROUND OF THE INVENTION

In the manufacture of glass fibers recent developments have involved the utilization of pressurized glass bushings which are designed to reduce the precious metal content of conventional glass fiber forming bushings. Thus, in U.S. Pat. No. 3,625,025 a process for forming glass fiber is described in which molten glass under pressure is caused to flow from a small cylindrical shaped bushing having a multiplicity of orifices drilled on the underside thereof. Bushings of this type contain large numbers of holes or orifices for fiber formation on an arcuate surface, the holes being closely spaced. Air cooling is used by shrouding the underside of the bushing with an air supply channel and flowing air across the bushing surface. This cooling is required to maintain good operation of the orifices or holes. It is desirable in some instances using this system to employ tips on the orifices to reduce any tendency for the molten glass coming out of one orifice to wet the bushing surface and coalesce with glass coming out of an adjacent orifice to form a bead. Because of the extremely close spacing of the orifices however, and the fact that they are positioned on an arcuate surface, the building of tips on a cylindrical bushing by conventional practices is extremely difficult and time consuming.

THE PRESENT INVENTION

In accordance with the instant invention a method is provided for building tubular bushings for use in pressurized glass systems that are provided with tips and can be readily assembled for use. The method of the instant invention permits fabrication of such bushings rapidly and eliminates the necessity of the time consuming individual building of tips on a prefabricated sheet and drilling holes.

Thus, in accordance with the instant invention an elongated sheet of metal capable of withstanding an environment of molten glass, platinum and platinum-rhodium alloys of 80 percent platinum and 20 percent rhodium being typical metals, is placed in a press between two dies. The male die or punch is provided with staggered rows of projections which correspond in size to the volume of the tip to be formed on the finished bushing. The female die is provided with depressions which correspond to the geometry of the outside of the tip and are adapted to receive the punch when the punch and the die are mated. Using a suitable press, the metal to be fabricated is placed between the punch and the die and the press is closed to mate the punch and die with the metal sheet placed between them. This operation results in the formation of a plurality of projections on one side of the metal sheet with a corresponding indentation above each of said projections. After the requisite member of projections have been provided in the metal sheet along the long axis thereof and for a sufficient width to provide a finished bushing, the metal sheet is placed over a molding unit with the projections facing downward. An arcuate male molding member is forced down on the sheet forming it into a semicurved shape and provision is made in the bottom of the mold for the reception of the projections on the underside of the sheet to prevent damage thereto. After the sheet has been molded into an arcuate form, the plunger is removed from the mold, the leading edges of the sheet are pressed together around a solid rod fitted into the mold on the sheet to bring them into alignment with each other. The rod is removed and the seam is welded closed.

For a more complete understanding of the instant invention, reference is made to the accompanying drawings in which:

FIG. 5 is a side elevation in section showing an alternative method of providing holes therein;

FIG. 6 is a side elevation of a mold used to form the sheet of FIG. 2 into a partially arcuate shape;

FIG. 7 is a side elevation of the mold of FIG. 6 showing the sheet bent into arcuate shape;

Figure 1:
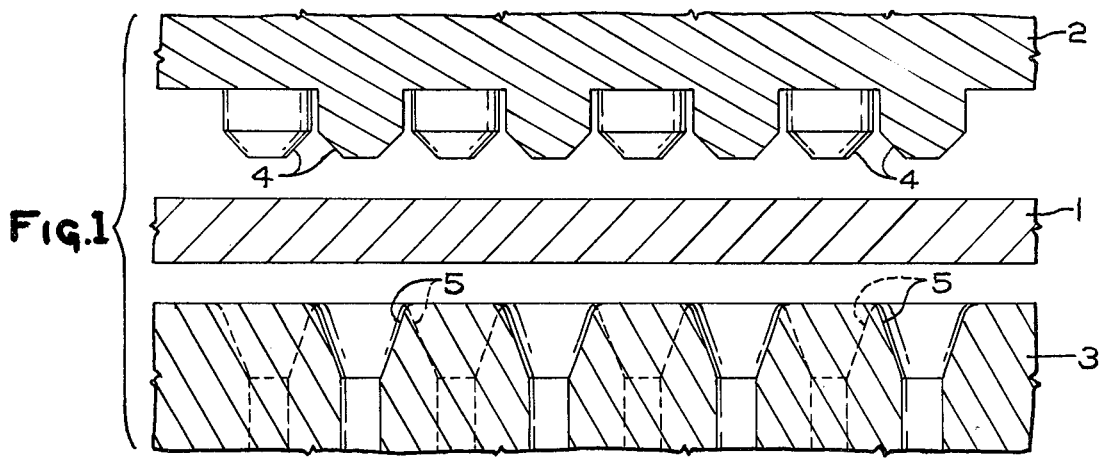
FIG. 1 is an exploded side elevational view of the male and female die with the metal sheet in position between them.

The bushings prepared with tips in accordance with this invention are generally cylindrical in shape and thus in operation during glass fiber formation have the tips through which the molten glass flows positioned on an arcuate surface. With a conventional bushing the bottom is normally flat and tips are formed by hand using a torch and platinum wire. In this operation the tip is built up by adding platinum from the wire onto the flat plate forming the bushing bottom. In commercial size bushings having 600 to 2,000 holes this is a time consuming and costly operation. With arcuate bushings of the type hereinbefore discussed to be used in a pressurized glass forming system, a 1.67 inch (42.5 millimeters) wide and 24 inch(610 millimeters) long sheet used to form an entire bushing ½ inch (12 millimeters) in diameter and 24 inches (610 millimeters) in length can have as many as 2,000 holes and they are not on a flat surface. This renders any hand building of tips an extremely arduous task and more so since the tips are not being positioned on a flat surface.

In the practice of this invention therefore and with reference to the accompanying drawings an efficient and effective method of providing tipped orifices for a pressurized, arcuate bushing will be described.

In the first step of the instant method a sheet of the metal forming the bushing is shown as 1. This sheet of metal 1 is preferably an alloy consisting of 80 percent platinum and 20 percent rhodium on a weight basis. This alloy is found particularly suitable in service as a bushing material for processing molten glass since it possesses good strength and minimum precious metal loss in operation. While this alloy is the preferred metal for use in practicing the invention, it is of course understood that other precious metals and alloys thereof may be used if desired. Typically, pure platinum can be utilized as well as alloys of platinum with other of the precious metals, gold, palladium, rhodium, iridium and mixtures thereof.

Figure 2:
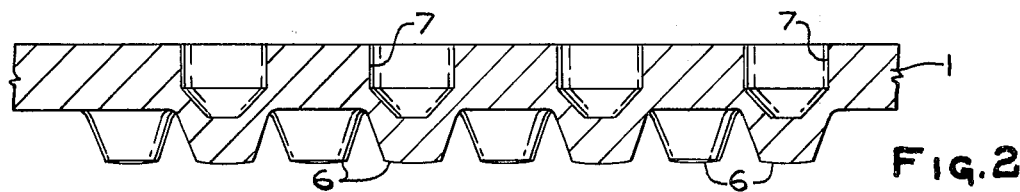
FIG. 2 is a side elevation in section of the metal sheet 1 of FIG. 1 after stamping.
Figure 3:
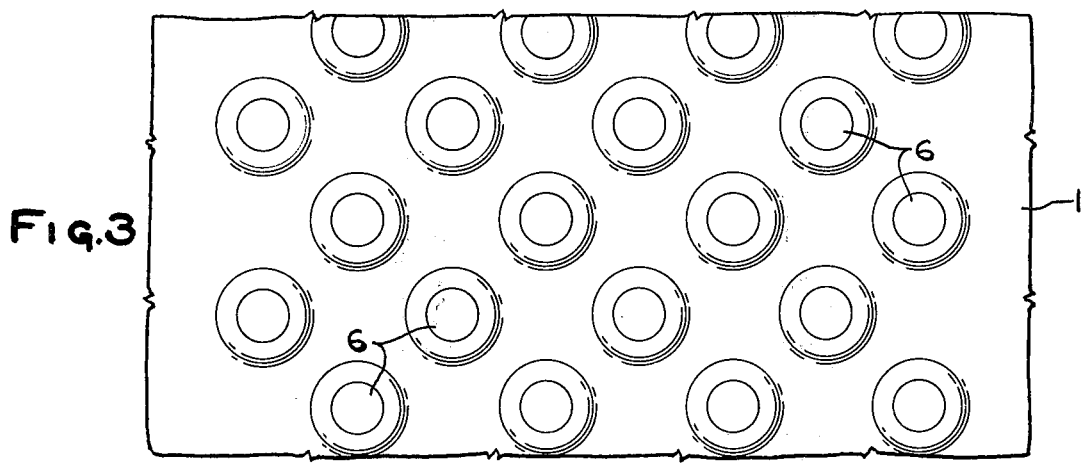
FIG. 3 is a plan view of the bottom of the sheet of FIG. 2 showing the projection orientation.

Positioned above metal sheet 1 is a punch 2. Positioned below the sheet 1 is a matrix or die 3 which is constructed and arranged to mate with punch 2 when they are brought together. Punch 2 and die 3 are positioned in a suitable press not shown and aligned to mate when moved toward each other. The punch 2 is provided on its underside with a plurality of staggered projections 4 which conform in length, diameter and shape to the volume of metal displacement desired on sheet 1. Recesses 5 are provided in die 3 to receive the metal 1 when the punch 2 and die 3 are brought together by the operation of the press in which they are placed. The punch 2 and die or matrix 3 are preferably formed of machined steel. In the operation of the system the sheet 1 is placed in the press between punch 2 and die 3. The press is closed to move punch 2 and die 3 together and deform the sheet 1 to the contour of the projections 4 as the metal sheet 1 is forced by these projections 4 into recesses 5 by the exertion of mechanical pressure thereon through the press. The sheet 1 after it has been processed in the punch and die set, has the appearance shown in FIG. 2. The finished sheet thus has tip blanks 6 located on the underside and recesses in the upper side. The orientation of the tip blanks 6 shown in FIG. 2 is shown more clearly in FIG. 3. Using the die set of FIG. 1, any number of tips in this case 8 may be produced in a single operation across the width of the sheet 1 in two staggered rows. The sheet is indexed in the die along its long axis to repeat this pattern until the desired number of tip blanks 6 are provided along the length of the sheet, typically 800 to 2,000 or more are provided. While in the embodiment shown two staggered rows of blanks 6 are prepared, it will be understood that more or less than this number can be made by an appropriate change in the die set used.

The sheet 1 having the blanks 6 provided along its long axis is now in condition for the application thereto of suitable orifices to provide communication from the interior of the bushing to be prepared and the external surface of the tips.

Figure 4:
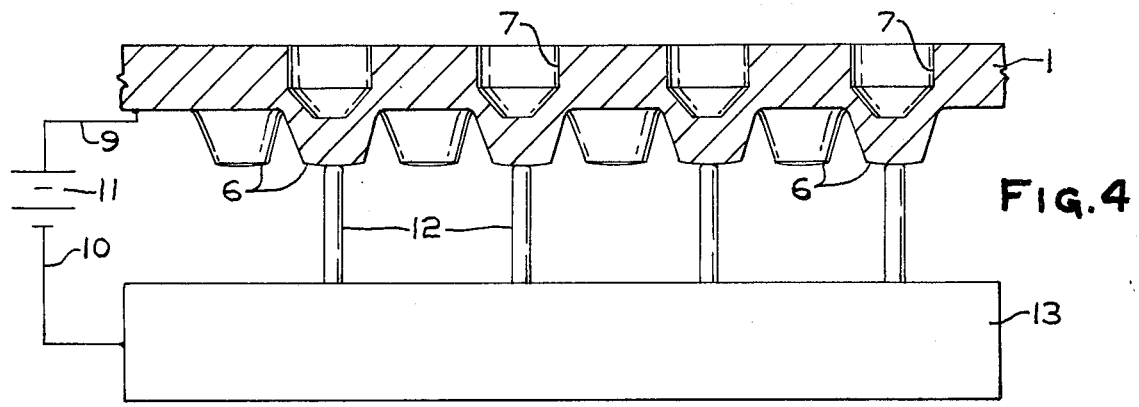
FIG. 4 is a side elevation in section of the sheet of FIG. 2 in position in an E.D.M. machine used for providing holes therein.
Figure 8:
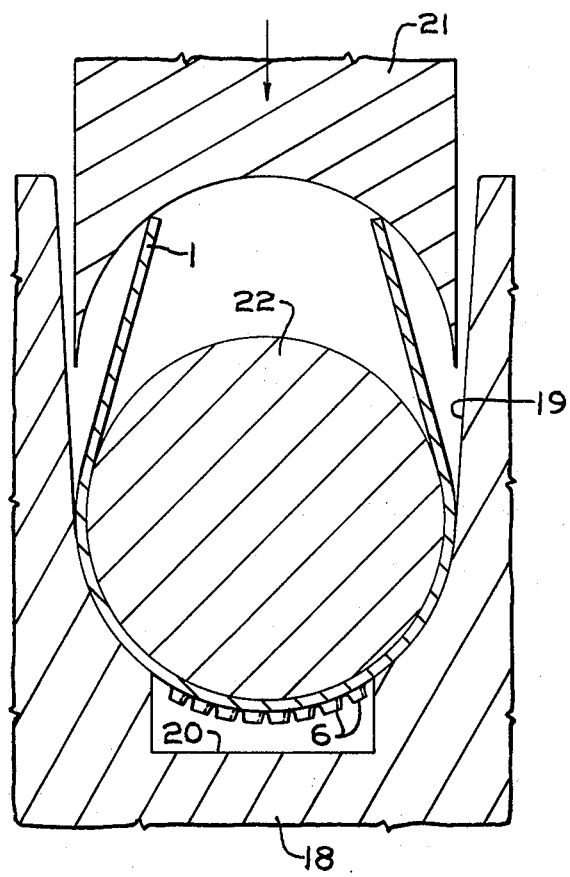
FIG. 8 is a side elevation of the mold of FIG. 6 showing the method completing the cylindrical housing final shape.

FIG. 4 shows one method of providing holes in the blanks or tips 6. In this embodiment an electric discharge machining (EDM) method is used to provide four holes, one in each of the four tips 6 shown.

Thus, the work piece or sheet 1 is connected via leads 9 across a voltage source 11 and lead 10 to a series of electrodes 12 which are aligned to be in non-touching but close proximity to the bottom of the blanks 6 to be drilled. The work piece and electrodes are typically immersed in a fluid of low electrical conductivity such as a light oil. When sufficient voltage is applied across the junction between electrode 12 and the surface of the blanks 6, an electrical discharge in the form of a spark occurs. Current densities on the order of $10^6$ amperes per square inch (per 6.45 square centimeters) are typical.

The gap between blanks 6 and electrodes 12 is maintained by an automatic electrical control system such as a servo mechanism. By repeated, rapid, cyclic discharges of sparks at the electrodes 12-blanks 6 interface (thousands of sparks per second), the blanks 6 are eroded and a resulting hole is made therein in each of the blanks 6. This system can be used to drill any number of holes in a corresponding number of blanks 6 simultaneously. This method of applying holes in a metal surface is well known in the metal working art and is further described in more detail in the *Standard Handbook For Mechanical Engineers*, Baumeister and Marks, Seventh Edition, McGraw-Hill Publishing Co., N.Y. 1966 in Chapter 13 at page 103. Another description of this system is contained on pages 730 through 732 of *Materials and Process in Manufacturing*, second Edition, 1964, published by the Macmillan Company, N.Y. The use of this process permits the machining of several of the desired holes simultaneously in the tips 6.

If desired, the sheet 1 may also be drilled as shown in FIG. 5 by passing a suitably sized bit 15 through a recess 7 and the blanks 6 below it in the manner depicted therein to provide a suitable orifice or hole 16 in the blanks 6 thereby forming a finished tip.

After the tips 6 have each been provided with a suitable hole 16 therein, the sheet 1 is now in condition for the final fabrication phase of the manufacturing process.

This process is depicted in FIGS. 6, 7, 8 and 9. The sheet 1 having the tips 6 prepared as described above is placed in a die 18. As shown in FIG. 6, die 18 has a curved bottom 19 and sloping interior sidewalls. A recess 20 is provided at the center of the bottom of the die 18 and this die 18 is designed geometrically to receive the ram 17 which is shaped to conform to the curvature required for the bushing being formed. Ram 17 is pushed into the die 18 by exerting pressure on the sheet 1 and the sheet is deformed into the curved shape of the bushing to be formed as seen in FIG. 7. The bushing tips 6 fall into the recess or cavity 20 in the bottom of the die 18 and are thus protected from damage as the ram 17 deforms the metal sheet 1.

Figure 9:
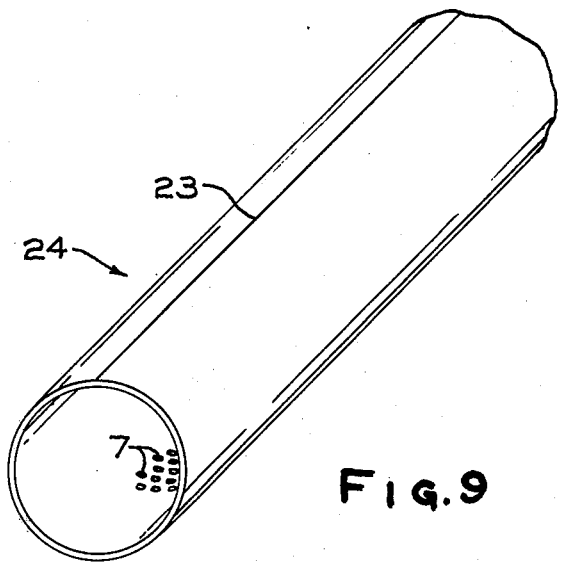
FIG. 9 is a perspective view of the cylindrical bushing in final shape for welding.

The ram 17 is then removed from the die 18 and a solid, cylindrical metal bar 22 is placed in the bottom of the die 18 on top of the sheet 1. The edges 1a and 1b of the sheet 1 are then forced around the contour of the metal bar 14 by lowering into the die 18 a concave tool 21 shaped to form the upper half of the circular bushing being prepared. As the tool 21 is lowered into the die 18, edges 1a and 1b are bent inwardly toward each other until they are in abutting relationship to each other. The rod or bar 22 is then removed and the rolled metal sheet 1 is now in the shape desired for use as a bushing as shown in FIG. 9. The seam 23 formed by the abutment of edges 1a and 1b is then welded to close the bushing on its long axis and the tubular bushing 24 is now ready to be fitted into a glass delivery system for use in producing glass fibers. The final fabrication of the bushing involves sealing one end with a welded plate not shown and sealing the open end to the source of molten glass.

In typical service the bushings fabricated in accordance with this invention are used in units similar to those described in U.S. Pat. No. 3,625,025.

As will be readily appreciated, the fabrication process of the instant invention permits the rapid formation of extremely small bushing units containing multiple tips. Thus, in a typical operation using a die set that provided eight tips in two staggered rows per punch, a sheet 1, 24 inches (610 millimeters) long and 1.67 inches (42.5 millimeters) wide was punched in a press and indexed after each punch to provide on sheet 1 a total of 2,000 tips. The tips were then drilled to provide a hole up to approximately 0.022 inch (0.55 millimeter) and the finished tip area had an overall length of 16 inches (40.6 millimeters) by 0.35 inch (8.8 millimeter). The fabrication of the finished cylindrical tube shown in FIG. 9 took a total time of 8 man-hours. It is calculated that hand fashioning the tips 6 on a cylindrical tube of similar size with 2,000 holes would be a nearly impossible task. Fabrication of a comparable conventional bushing would require 90 man-hours. Moreover, the use of punch and die methods and EDM techniques combined with the single straight weld seam provides a basis for very low fabrication time estimated in minutes on a mass production basis.

As can be seen, the instant process provides the art with a useful method of producing a tubular bushing in an effective and economically efficient manner. While modification can be made in the above-described system which has been illustrated by the embodiments contained herein, it is not intended that the invention be limited by those illustrated embodiments except insofar as appears in the accompanying claims.

I claim:

1. In a method of preparing glass fiber bushings suitable for use in drawing glass fibers therefrom, the steps comprising placing an elongated precious metal sheet having a generally rectangular configuration between a punch and die set provided with staggered rows of projections on the punch and corresponding staggered rows of depressions on the die, mating punch and the die with the precious metal sheet placed between them to produce a plurality of projections on one side of the metal sheet of the shape and size of a desired bushing tip, indexing the sheet along the long axis thereof mating the punch and die and continuing this operation until the desired number of projections have been produced on the precious metal sheet for the desired number of bushing tips, placing the metal sheet below an arcuate male molding member adapted to be received into a semicurved mating mold which has provided in the bottom thereof a cavity for the reception of the projections contained on said sheet, moving the arcuate male molding member on top of the sheet and forcing it into a semicurved shaped in the mating mold such that the projections are located within the cavity, removing the male mold after the sheet has been molded into arcuate form, placing a solid cylindrical rod inside of the mold and on top of the precious metal sheet contained therein, curving the leading edges of the precious metal sheet around the solid rod until they abut each other, removing the rod and welding the seam formed by the abutting edges closed to thereby provide a circular bushing open at each end and provided with a plurality of staggered rows of bushing tips.

2. The method of claim 1 wherein prior to placing the metal sheet over the molding unit, each of the projections has a small hole drilled through it.

3. In the preparation of a cylindrical fiber glass bushing suitable for use in drawing glass fibers, the steps comprising introducing an elongated rectangular sheet of material suitable for use in a molten glass environment between a punch and die set constructed and arranged to produce a plurality of projections on one side of said sheet with corresponding depressions on the other side thereof when the punch and die set are moved together, moving the punch and die set together with sufficient force to provide said projections and depressions on said sheet, indexing the sheet along the long axis thereof to continue providing a plurality of projections and depressions along the length of the sheet until a desired number of projections of the shape and size of a desired bushing tip have been provided, forming a hole in each of said projections and the corresponding depressions located thereabove, placing the sheet having the depressions with holes formed therein on a mold, providing at the bottom of said mold a recess for the introduction of said projections to prevent damage thereto during molding into a semicurved shape, introducing an arcuate male molding member on top of the sheet; forcing the sheet down into the molding member and into the semicurved shape such that the projections are located within the cavity, removing the arcuate molding member, introducing a solid cylindrical rod on top of the semicurved sheet, curving the leading edges of the sheet around the solid bar until they abut each other, removing the solid bar and welding the circular open-ended cylinder thus produced along the seam to provide an elongated cylinder open at each end.

4. The method of claim 3 wherein a closure plate is welded on one end of the open cylinder after the elongated seam has been welded.

5. The method of claim 3 wherein the holes are drilled by an electric discharge machine system.

6. The method of claim 3 wherein the holes are provided by mechanical drilling.

* * * * *

UNITED STATES PATENT AND TRADEMARK OFFICE
CERTIFICATE OF CORRECTION

PATENT NO. : 3,973,717
DATED : August 10, 1976
INVENTOR(S) : Thomas H. Jensen

It is certified that error appears in the above-identified patent and that said Letters Patent are hereby corrected as shown below:

Column 5, line 21, after "mating" insert --the--.

Column 5, line 25, after "thereof" insert --after--.

Column 5, line 35, cancel "shaped" and insert --shape--.

Signed and Sealed this

Second Day of November 1976

[SEAL]

Attest:

RUTH C. MASON
*Attesting Officer*

C. MARSHALL DANN
*Commissioner of Patents and Trademarks*